United States Patent [19]

Friedrichs

[11] Patent Number: 4,597,720

[45] Date of Patent: Jul. 1, 1986

[54] CLEANING APPARATUS FOR THE WET CLEANING OF BUILDING WALLS AND FLOORS, SWIMMING POOLS, AUTOMOBILES AND THE LIKE

[76] Inventor: Ingo H. Friedrichs, Kahlen Brink 13, 4952 Porta Westfalica, Fed. Rep. of Germany

[21] Appl. No.: 287,060

[22] Filed: Jul. 27, 1981

Related U.S. Application Data

[63] Continuation of Ser. No. 60,845, Jul. 26, 1979, abandoned.

[51] Int. Cl.[4] .......................... F04B 35/04; F04B 39/06
[52] U.S. Cl. ..................................... 417/368; 417/419
[58] Field of Search ................. 417/419, 367, 368, 372

[56] References Cited

U.S. PATENT DOCUMENTS

| | | | |
|---|---|---|---|
| 2,504,528 | 4/1950 | Hume | 417/372 |
| 2,556,435 | 6/1951 | Moehr et al. | 417/367 |
| 2,568,548 | 9/1951 | Howard et al. | 417/367 |
| 2,735,026 | 2/1956 | Moehr | 417/368 |
| 3,318,253 | 5/1967 | Campolong | 417/367 |
| 3,514,225 | 5/1970 | Monden et al. | 417/367 |
| 3,653,785 | 4/1972 | Dahlgren | 417/368 |
| 3,822,967 | 7/1974 | Cade | 417/368 |
| 3,918,479 | 11/1975 | Perl | 417/367 |
| 3,922,114 | 11/1975 | Hamilton | 417/372 |
| 3,922,133 | 11/1976 | Brunner | 417/372 |

FOREIGN PATENT DOCUMENTS

| | | | |
|---|---|---|---|
| 1406155 | 9/1975 | United Kingdom | 134/108 |
| 306285 | 6/1971 | U.S.S.R. | 417/366 |

*Primary Examiner*—William L. Freeh
*Attorney, Agent, or Firm*—Michael J. Striker

[57] ABSTRACT

A cleaning apparatus for wet cleaning building walls and/or floors and the like by means of high-pressure jet of cleaning liquid, which includes a pump driven by an electromotor. The pump and the electromotor are carried on a common shaft formed with a central passage and two opposite cross bores provided at the upper end thereof. The housing of the apparatus is filled with an electrically non-conductive coolant separated from the cleaning liquid. The parts of the pump through which the washing cleaning circulates are exposed to the coolant circulating through the central passage and cross bores of the shaft.

20 Claims, 7 Drawing Figures

CLEANING APPARATUS FOR THE WET CLEANING OF BUILDING WALLS AND FLOORS, SWIMMING POOLS, AUTOMOBILES AND THE LIKE

This is a continuation of application Ser. No. 060,845, filed July 26, 1979, now abandoned.

BACKGROUND OF THE INVENTION

The invention relates to a cleaning apparatus for the wet cleaning of building walls and floors, swimming pools, automobiles and the like, by means of a high-pressure jet of, washing or cleaning fluid, based on water with or without additives, the apparatus being provided with a pump driven by an electric motor, particularly a squirrel-cage motor, for the generation of the jet pressure, and provided with means to regulate at least the pressure of the discharged liquid which may originate from the water mains, a reservoir or a mixing vessel.

Cleaning apparatus of the type of such high-pressure spraying units are known in technology for the most differing purposes, in stationary arrangement, f.i. for motor vehicle washing installations, and also as portable or movable units, wherein they mainly serve for the wet cleaning of the walls and floors or buildings, f.i. of stables, but also for any other objects or installations as desired, f.i. surfaces covered with plastics, tarpaulins, swimming pools or the like. Corresponding to the respective application, the water serving as cleaning or washing liquid may be provided with appropriate additives f.i. in the form of alkaline or acidic cleaning, corrosion proofing, lubricating, or washing agents. The spraying of, cleaning or washing liquid is accomplished, at least with smaller and movable units, by means of hand-held spraying nozzles, particularly in the form of spraying pistols. It can, however, particularly with stationary apparatus, also be effected by means of nozzles or similar in stationary installation, connected to the delivery line of the high pressure unit by a flexible line, or a nose.

The known cleaning apparatus of the category described above, have the disadvantage of their design concept resulting in a complicated construction, and they have thus comparatively large dimensions as well as a high weight of their construction relative to their capacity. Although this disadvantage will be considerable also with stationary or fixed cleaning apparatus, for motor vehicle washing installations, this disadvantage is of special importance with such cleaning apparatus of the category discussed herein which, according to the intended use, should be easily portable, and at any rate easily movable for domestic and private use.

The reason for the comparatively voluminous and heavy construction of the cleaning apparatus as known, lies in the fact that the generation of the high pressure jet is usually effected by a plunger pump with three pistons arranged in line, driven by a motor arranged separately from the pump, wherein the power transmission between motor and pump will usually lead to a further increase in the expenditure of construction. This arrangement will usually also force the provision of both parts of the high-pressure unit with an appropriately extensive, and expensive, cowling.

To the above it must be added, that the electric motors which, are usually used for this purpose will on one hand require, due to the air cooling, the construction of complicated and larger housings, and on the other hand will generate objectionable noise during continuous operation. As far as squirrel cage motors are used herein, they are of the disadvantage that they may overload the pump by means of the pulling-out torque and will thus require additional safeguards against causing excessive pressure thereby. On the other hand, the pulling-out torque of air-cooled squirred-cage motors may be utilized only momentarily for the power output of the pump, but not during continual operation.

From the reasons as given, the known cleaning apparatus of the afore-described category is not only of complicated, and correspondingly expensive construction, relatively large dimensions, and correspondingly high weight, but also expensive in procurement and maintenance, so that these facts are in opposition to wider use, especially in private and domestic applications.

SUMMARY OF THE INVENTION

It is an object of the invention to basically change the design concept of cleaning apparatus of this category, and to improve it in such a manner that, by avoiding the aforenamed disadvantages, the cleaning apparatus can not only be of a considerably simpler construction but can also simultaneously be of such a compact design that, with the same capacity, it will turn out to be considerably smaller and correspondingly lighter in its weight. This compact design shall not only lower the cost of production, but contribute to such a far-reaching reduction in weight that the apparatus may easily be moved and may even simply be carried by hand at any time.

For the solution of this object, the cleaning apparatus as per invention distinguishes itself by the following features:

(a) The motor and pump soudings form a common operating space closed to the outside, in which the armature of the electric motor and the rotary drive of the pump are axially offset relative to each other, and carried on a common shaft extending through the operating space.

(b) The operating space containing the electric motor and the pump is filled with an electrically nonconductive coolant, which is separated from the cleaning or washing liquid respectively, up to such a level that the pump as well as the electric motor will lie below the level of the coolant.

(c) Those parts of the pump through which the cold cleaning or washing liquid circulates, and which are exposed to the coolant, as well as their supply and discharge ports, will form the heat exchanger for the continuous recooling of the coolant.

(d) The rotating parts of the pump and/or the electric motor, or the shaft respectively, are provided with means of circulation which will, at least indirectly, cause a continuous forced circulation between cold and heated coolant within the operating space.

In this manner it is possible to achieve, with very limited constructional expenditure, a high-capacity spraying unit of compact design and of a moderate constructional weight, resulting therefrom, which will enable easy transporting of the cleaning apparatus by hand.

Since the motor and the pump are located in a common operating space closed to the outside, and since the housing parts required therefor are not larger than it is necessitated in any way by the enclosure and the bearings of the motor and the pump, an extremely compact construction will result, which furthermore allows dispensing with additional shrouding. The coolant, contained in the operating space and flowing around the pump as well as the motor, allows herein to subject the electric motor, particularly the squirrel-cage motor, to higher loads even in continuous operation, then would be permissible with the usual air-cooled electric motors. This is ensured on one hand, by subjecting the coolant within the enclosed operating space to continuous forced circulation by means of circulation appurtenant to the rotary components, and, on the other hand by those parts of the pump and its supply and discharge ports which are exposed in the operating space to the coolant forming comparatively large areas of heat exchange surfaces since internally they are impinged by the cool cleaning or washing liquid, with such heat-exchange surfaces which furthermore allow extension within wide limits, if so required, without enlarging the design dimensions or the constructional expenditure.

Surprisingly, it has been shown that is it possible to design by the aforenamed means of the invention, a cleaning apparatus of the usual capacity with a water-spray pressure of 200 to 250 bar, of such small dimensions that it will then only be of the height of a commercial water bottle with a liquid content of one liter.

In order to generate the aforementioned spraying pressure it has hitherto been necessary to use an electric motor with a rated output of about 5 kilowatt, whereas, availing oneself of all advantages of the design as per invention use can be made of a considerably smaller electric motor with a rated output of 1.5 kilowatt.

Besides this comparison of dimensions, the comparison of weights also carries considerable importance. Whilst with conventional cleaning apparatus of the category discussed herein, the electric motor alone, with a rated output of 5 kilowatt already has a weight of 35 kilograms, the complete apparatus as per invention is of a total weight of only 23 kilograms, so that it may be designated as a high-capacity apparatus, easy to handle weight-wise, and, particularly, since it can be carried by hand.

It has proved to be preferential to use oil as coolant, especially since in this instance the coolant may concomitantly be used as lubricant for the rotating and moving parts of the pump.

Full benefits from the solution as per invention will be obtained when the electric motor, designed as a squirrel-cage motor is underdimensioned as to its rated output, relative to the power requirement of the pump as predicated by the pressure required for the delivered jet; under full load it will be operating close to its pulling-out torque and with a concomitant drop in its rotating speed. This is the case if, instead of the squirrel-cage motor with a rated output of 5 kilowatt, as hitherto required for the same pump capacity, an electric motor with a rated output of only 1.5 kilowatt with correspondingly smaller constructional dimensions is used, which is however, subject to the essential further conditions which must be complied with the invention.

Although the pump to be used for the generation of the required jet pressure may be of different designs, it is particularly appropriate to design it as a radial piston pump since it can be adapted in the best possible manner, to the available cross-sectional area of the housing, also if it is of higher capacities, without obtaining the construction being too large in its axial height.

In order to improve the forced circulation of the coolant within the operating space of the electric motor and pump so as to best provide a possibly most intensified heat exchange, it may suffice in certain instances to provide vanes for the rotating parts, particularly for those of the electric motor.

Instead, or in addition, there may also be advantages as per a suitable development of the invention to achieve forced circulation of the coolant by providing the shaft with an axial suction passage and with at least one cross bore connected to the suction passage. Herein, the shaft may have a passage extending throughout its entire axial length, with cross bores for the throwing off of the coolant arranged diametrically opposed, and located at least at its upper end, and extending above the armature of the electric motor.

A deviating solution preferable in some instances consists as per invention in the shaft having a passage channel in the lower longitudinal zone at the level of the pump, the passage being connected in its upper as well as its lower end to at least two diametrically opposed cross bores, wherein the cross bores, located within the height of the pump, are provided with throwing tubes radially projecting outward relative to the outer circumference of the shaft in such a manner, that the upper cross bores will form the suction ports and the nozzles of the throwing tubes will form the discharge ports for the forced circulation of the coolant.

The continuous forced circulation within the operating space between coolant that is cold and that which has been heated up in the zone of the electric motor, may be additionally intensified, with the means as quoted by additionally providing more liquid-conducting flow passages within the housing walls of the stator and/or the armature, suitably designed and dimensioned in such a manner that conjointly with means of circulation appurtenant to the rotating parts a continuous circulation movement of the coolant will be ensured, in the direction as desired between the zones of the operating space above and below the electric motors.

Although it has been proved to be fully satisfactory to use as heat exchange surface for the heat exchange between the coolant and the cleaning or washing liquid, only the supply lines connecting the pump cylinders to each other and the discharge lines connecting the pump cylinders to each other which lines carry the cleaning or washing liquid. It may be an advantage to artificially enlarge these cooling surfaces which, in the manner described afore, may be anyway available for cooling.

This may be effected by extending or enlarging the cooling surfaces of the lines, as well as, in particular, by providing the various pipes with plates, ribs or the like which will enlarge the cooling surface.

In order to improve the exchange of heat, it is furthermore possible, and in given instances advisable, to extend the supply and discharge lines, but preferably the supply line, with at least one cooling passage within the housing, which will directly extend into the operating space filled with the coolant but below the coolant level and into the upper zone of the electric motor.

It is, of course, possible to considerably increase the extension of the cooling lines as obtained by the provision of cooling passages, for instance by locating the cooling passages in the upper zone of the housing and running through the coolant below its level, providing branches and coils, or by connecting the passages with the pump by several flow passages arranged in parallel within the housing walls.

The invention is explained more closely below, with the aid of examples of realization shown in the drawings.

DETAILED DESCRIPTION OF THE PREFERRED EMBODIMENTS

Figure 1:
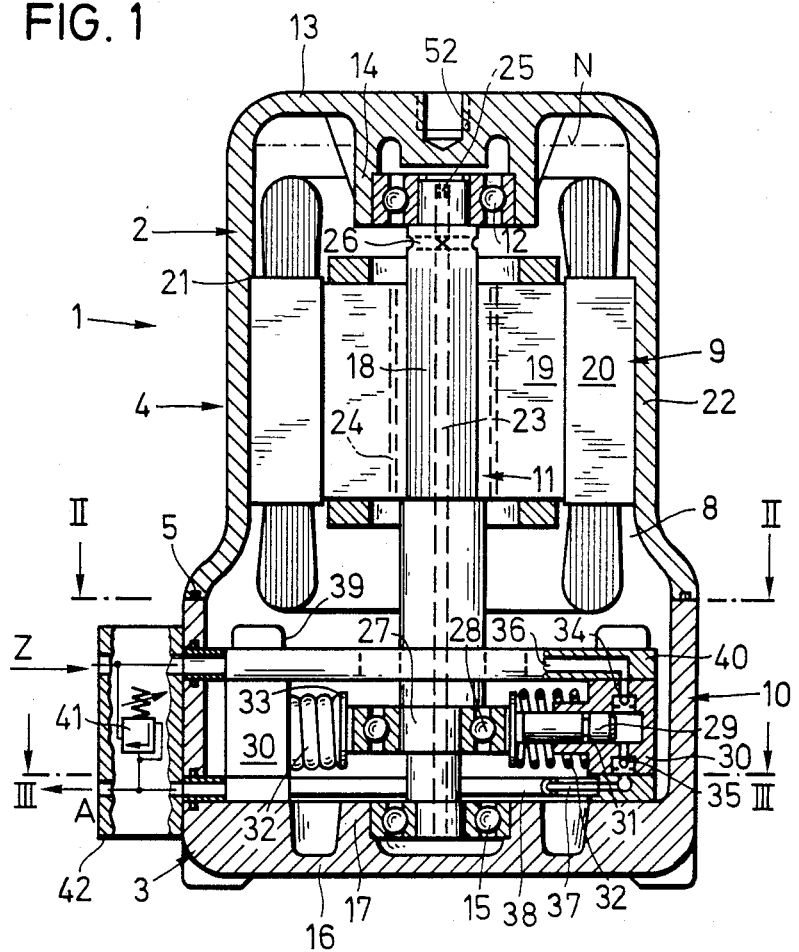
FIG. 1 shows a cleaning apparatus in vertical section.

The cleaning apparatus depicted in FIG. 1 shows a housing 4 consisting of two parts 2 and 3. The two housing parts 2, 3 abut along the sectional plane II—II wherein their opposing faces may engage one with another, meshing like a tenon and mortise. One seal at least, is however provided all along the perimeters of parts 2 and 3.

Figure 2:
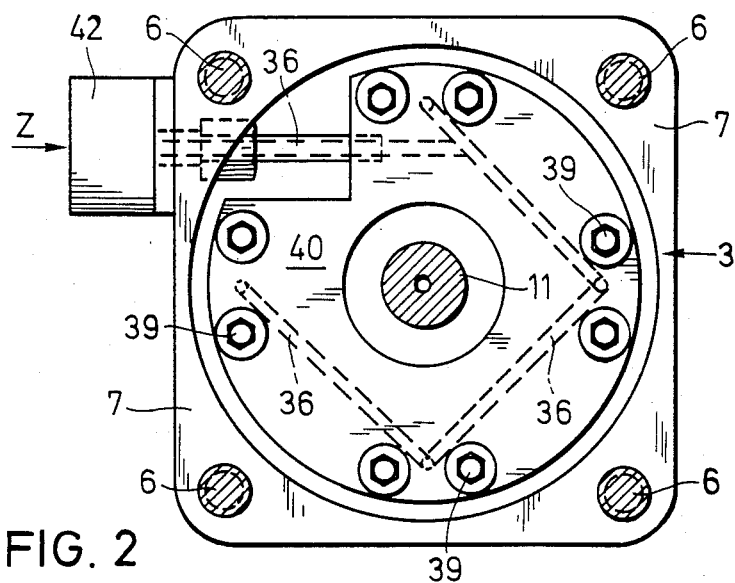
FIG. 2 is a horizontal cross section through the cleaning apparatus, along the line II—II of FIG. 1.

As will be noticed when observing the FIGS. 1 and 2 together, the two housing parts 2 and 3 are fastened together by bolts 6, offset at about 90°, and by nuts which cannot be recognized closer from the representations of the bolts extending through radial flanges 7 provided in the zone of the sectional plane II—II, and located at the end zones of the housing part 2, 3 which face each other. The housing part 2 is of a mainly circular cross section whilst the cross section of the housing part 3 is, in essence, in the shape of a square.

The two housing parts 2, 3 enclose an operating space 8 which in its upper zone accommodates an electric motor 9 designed as a squirrel-cage motor and in its lower zone a radial piston pump 10.

A shaft 11 with an axial bore throughout its length penetrates the operating space 8. The shaft 11 is supported, allowing rotation, on one side by a thrust bearing 12 located within a hub 14 projecting inward from as upper front wall 13 of the motor housing part 2, and on the other side by a combined thrust/radial bearing 15 located in a hub 17 projecting inward from a bottom 16 of the pump housing part 3.

An armature 19 of the electric motor 9 is attached to a longitudinal section 18 of a reduced diameter of shaft 11, whilst a stator 20 is located on a raised collar 21 of wall 22 of the motor housing part 2. The armature 19 is penetrated by longitudinal passages 24 arranged parallel to the axial bore 23 within the shaft 11 and which connect the zone of the operating space 8 above the electric motor 9 with the zone below the electric motor 9.

The connections to the electric motor 9 are not shown in order to maintain the clarity of the drawing.

FIG. 1 furthermore shows that the axial bore 23 within the shaft 11 is closed in the zone of the thrust bearing 12 by a plug 25, whilst, in the zone of the combined thrust/radial bearing 15 it opens into the operating space 8. Cross bores 26 are worked into the shaft 11, connecting the axial bore 23 with the operating space 8 and are located above the armature 19 of the electric motor 9, however below the thrust bearing 12.

An anti-friction bearing 28 is set upon an eccentric section 27 of the shaft 11 which is located within the height of the pump housing part 3, this bearing acting with its outer race onto 4 pistons 29, offset by 90° relative to each other, of the radial piston pump 10. The pistons 29 are each guided in their respective pump cylinder 30 forming a seal. A seal ring is identified with 31. The pistons 29 are affected by the return force of the helical compression springs 32 which rest on one side against the pump cylinders 30 and on the other side against the discs 33 which are acted upon by the eccentric bearing 28.

Figure 3:
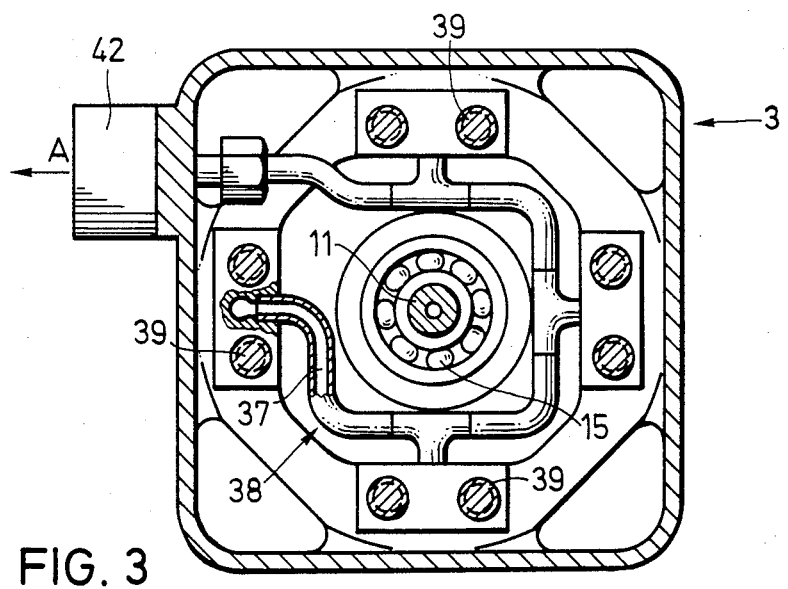
FIG. 3 is an additional horizontal cross section through the cleaning apparatus of FIG. 1 along the line III—III.

One suction valve 34 and one delivery valve 35 are respectively provided within the pump cylinder 30, connected by the passages 36, 37 (see also FIGS. 2 and 3 with the suction and delivery ports Z and A, respectively for a cleaning liquid delivered by the pump 10. Whilst the delivery passages 37 of the pump 10 are a component of a piping 38 located in the bottom zone of the pump housing part 3 (FIG. 3), the suction passages 36 are located within a plate 40, fastened by bolts 39 to the pump cylinders 30.

Within the zone of the suction and delivery ports A and Z for the cleaning liquid an adjustable pressure regulating valve 41 is connected respectively to the passages 36 and 37. The pressure regulating valve 41 is located in a housing 42 flanged onto the housing part 3.

The operating space 8 is filled about to a level (N) which is above the electric motor 9 with a coolant, preferably formed by oil. This coolant is consequently also the lubricant for the rotating or moving parts, of the pump 10.

Viewing the FIGS. 1 to 3 together, it will be recognized that those parts of the pump 10 in which the cold cleaning liquid circulates and which are exposed to the coolant in the operating space 8, and also their supply and delivery passages 36, 37, form a heat exchanger for the continuous recooling of the coolant. In this context, the axial bore 23 in the shaft 11 forms a suction passage for the coolant, whilst the cross bores 26 located at the upper end of the shaft 11, serve for the forced circulation of the coolant within the operating space 8.

Figure 4:
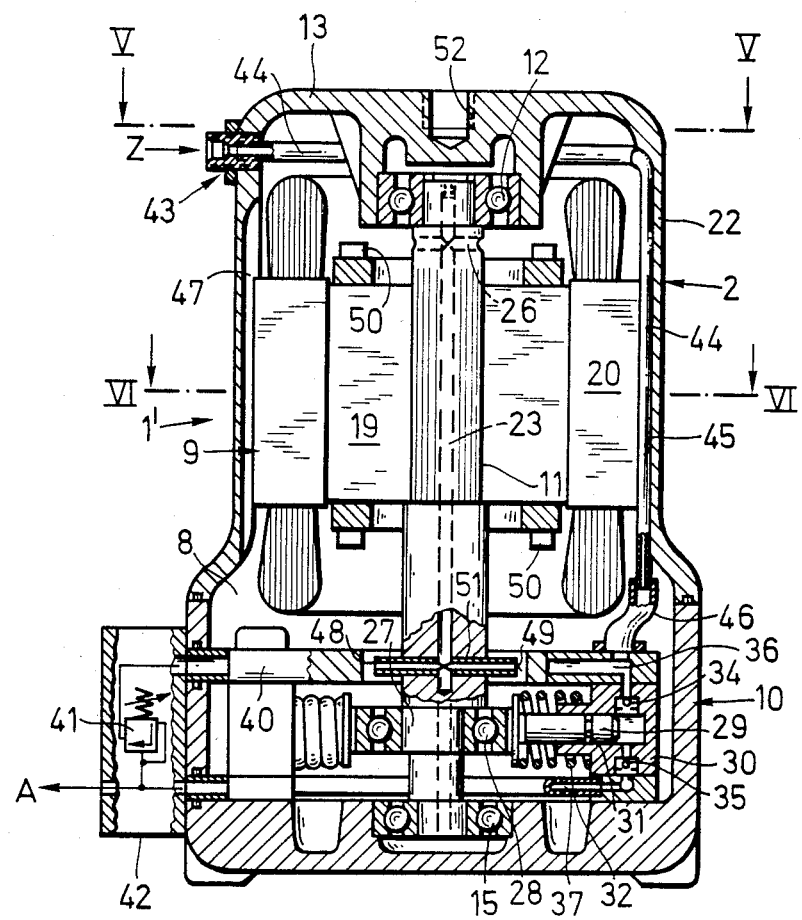
FIG. 4 illustrates a second version of a cleaning apparatus in a vertical longitudinal section.
Figure 5:
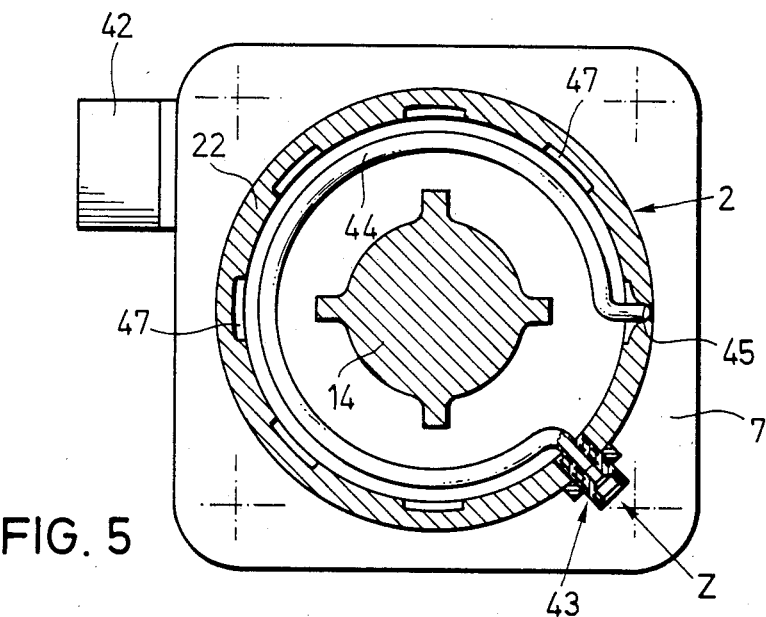
FIG. 5 shows a horizontal cross section through the cleaning apparatus of FIG. 4 along the line V—V.
Figure 6:
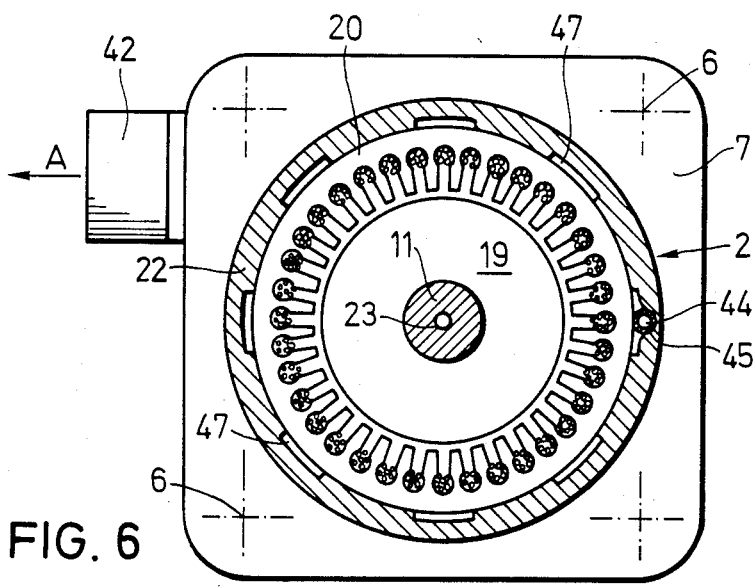
FIG. 6 is a horizontal cross section through the cleaning apparatus of FIG. 4 along the line VI—VI.

The design version of the cleaning apparatus 1' as per FIGS. 4 to 6, corresponds in its essential components to the design shown in FIGS. 1 to 3. Supply of the cleaning liquid to the pump 10 now, however, ensues in the zone of the upper front wall 13 of the motor housing part 2. As shown in FIGS. 4 and 5, the cooling liquid flows via a connecting nozzle 43 (the connecting nozzle 43 is shown in FIG. 4 turned by 135° relative to the arrangement as per FIG. 5) into a tubular cooling passage 44 which extends first across an angle of 315° in the plane of the connecting nozzle 43 along the wall 22 of the motor housing part 2, and is subsequently imbedded into a vertical groove 45 of the housing wall 22 at the circumference of the stator 20. In the zone of the joint of the pump housing passage 3 with the motor housing part 2, the cooling part 44 is then linked by a flexible connector 46 to the passages 36 within the heat exchanger plate 40, which has been described closer under reference to FIGS. 1 to 3.

A further difference of the version of FIGS. 4 to 6 relative to that of FIGS. 1 to 3, consists in vertical passages 47 worked into the wall 22 of the motor housing part 2 along the circumference of the stator 20 (see also FIGS. 5 and 6), the vertical passages consequently connecting the zone of the operating space 8 below the electric motor 9 with the zone above the electric motor 9.

FIG. 4 shows furthermore that the axial bore 23 through the shaft 11 is blocked about within the height of the pump 10. The shaft 11 has cross bores 51 at about the plane of the plate 40, provided with throwing-off tubes 48 which project radially relative to the outer circumference of the shaft 11. In this case, the upper cross bores 26 in the shaft 11 consequently form the suction ports, and the nozzles 49 of the throwing tubes 48 form the delivery ports for the coolant, this for the purpose of forced circulation within the operating space 8.

Finally, different from the version of FIG. 1 the version of FIG. 4 has vanes 50 which enhance the forced circulation of the coolant, distributed at the circumference at the front face of the armature 19 of the electric motor 9.

Figure 7:
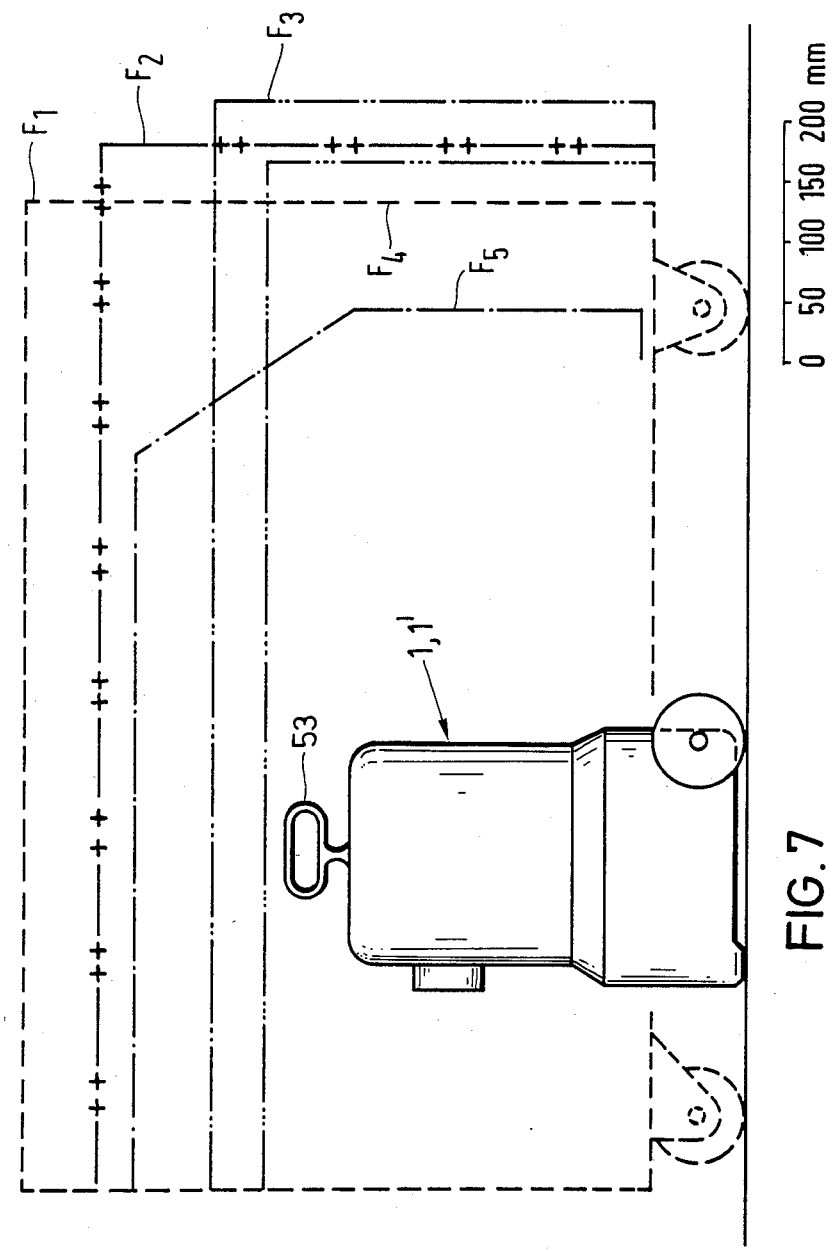
FIG. 7 is a dimensional comparison of a cleaning apparatus as per invention versus five different cleaning apparatus of the same capacity but with conventional electric drive.

The FIG. 7 shows a schematic representation of a dimensional comparison of the cleaning apparatus 1 and 1' versus five cleaning apparatuses of various manufacture $F_1$ to $F_5$, all with conventional electric drive, wherein the size of every product $F_1$ to $F_5$ is shown in different outlines. It is to be noted herein that changes in the weight and volume must be calculated with the third power of the linear change. Furthermore, it must be pointed out that conventional designs of cleaning apparatus do in part contain considerable hollow spaces, with, however, the cleaning apparatus 1, 1' of the invention being of compact construction with an optimal utilization of the required space.

The FIG. 7 demonstrates that the complete cleaning apparatus 1, 1' as per invention requires much less space and is of a weight considerably lower than the weight of only the electric motor, without any accessories in conventionally designed and driven cleaning apparatus.

In the FIGS. 1 and 4, 52 denotes a tapped hole in the front wall 13, provided for a detachable carrying a handle 53 (FIG. 7).

I claim:

1. A cleaning apparatus for wet cleaning of walls or floors of buildings and the like by means of a high-pressure jet of a relatively cold washing liquid, comprising a housing; an electromotor including a stator and an armature; a pump having a drive driven by said electromotor and operative for generating said high-pressure jet, said electromotor and said pump being accommodated in said housing, said housing being filled with an electrically non-conductive coolant to such a level that said pump and said electromotor are located below said level, said coolant contained in said housing constituting an operating space; a shaft having an upper end and a lower end and carrying said armature and extending through said operating space, said drive being mounted on said lower end and axially offset relative to said armature; means for conducting said washing liquid within said housing, said conducting means being exposed to said coolant which is continuously cooled in heat exchange relationship with the washing liquid; and means for circulating said coolant within said housing including a central suction passage formed in said shaft and extended in an axial direction thereof up to said upper end and at least one cross bore also formed in said shaft at the upper end thereof and communicating with said passage, said circulating means at least indirectly causing the continuous forced circulation between cold and heated coolant in said operating space.

2. The apparatus of claim 1, wherein said washing liquid is based on water.

3. The apparatus of claim 2, wherein said liquid contains additives.

4. The apparatus of claim 1, wherein said coolant is a lubricating oil.

5. The apparatus of claim 4, wherein said electromotor is a squirrel-cage motor.

6. The apparatus of claim 5, wherein said pump is a high pressure radial piston pump.

7. The apparatus of claim 6, wherein said housing includes a first part accommodating said electromotor and a second part accommodating said pump, said first part being sealingly connected to said second part.

8. The apparatus of claim 7, wherein said drive of said pump includes an eccentric bearing, said shaft having a lower end zone supported in said eccentric bearing.

9. The apparatus of claim 8, wherein said housing has an upper wall and a bottom wall.

10. The apparatus of claim 9, further including an upper bearing mounted in said upper wall and a lower bearing mounted in said bottom wall, said upper end being supported in said upper bearing, said lower end being supported in said lower bearing.

11. The apparatus of claim 10, wherein two upper cross bores are formed in said shaft, said cross bores being diametrically opposed to one another and located at said upper end of said shaft, said upper end extending beyond said armature toward said upper wall.

12. The apparatus of claim 11, wherein said pump includes a number of pump cylinders, and said conducting means include liquid supply lines and liquid delivery lines, said pump cylinders, said supply lines and said delivery lines being interconnected to each other.

13. The apparatus of claim 12, wherein said delivery lines have a cooling surface being relatively larger than the surface required for conducting said liquid only to thereby intensify said heat exchange relationship of said liquid with said coolant.

14. The apparatus of claim 12, further comprising passages extended in said axial direction and adapted for connecting the region of said operating space located above said electromotor and the region of said operating space located below said electromotor.

15. The apparatus of claim 14, wherein said passages are formed in said armature.

16. The apparatus of claim 14, wherein said supplying lines are located within said pump.

17. The apparatus of claim 14, wherein said passages are formed in said stator.

18. The apparatus of claim 14, wherein said passages are formed in said housing.

19. The apparatus of claim 18, wherein said supplying lines are located within said housing and include at least one cooling passage located in said operating space but below said level.

20. The apparatus of claim 19, wherein said suction passage in said shaft extends to the level of the height of said pump, said shaft being further formed with two lower cross bores, said cross bores being diametrically opposed one to another and located within the region of said pump, said shaft being provided with two tubes outwardly radially projecting from said suction passage and mounted in said lower cross bores and terminated with nozzles, said upper cross bores in said shaft forming suction ports whereas said nozzles of said tubes form discharge ports for said coolant in said continuous forced circulation.

* * * * *